UNITED STATES PATENT OFFICE.

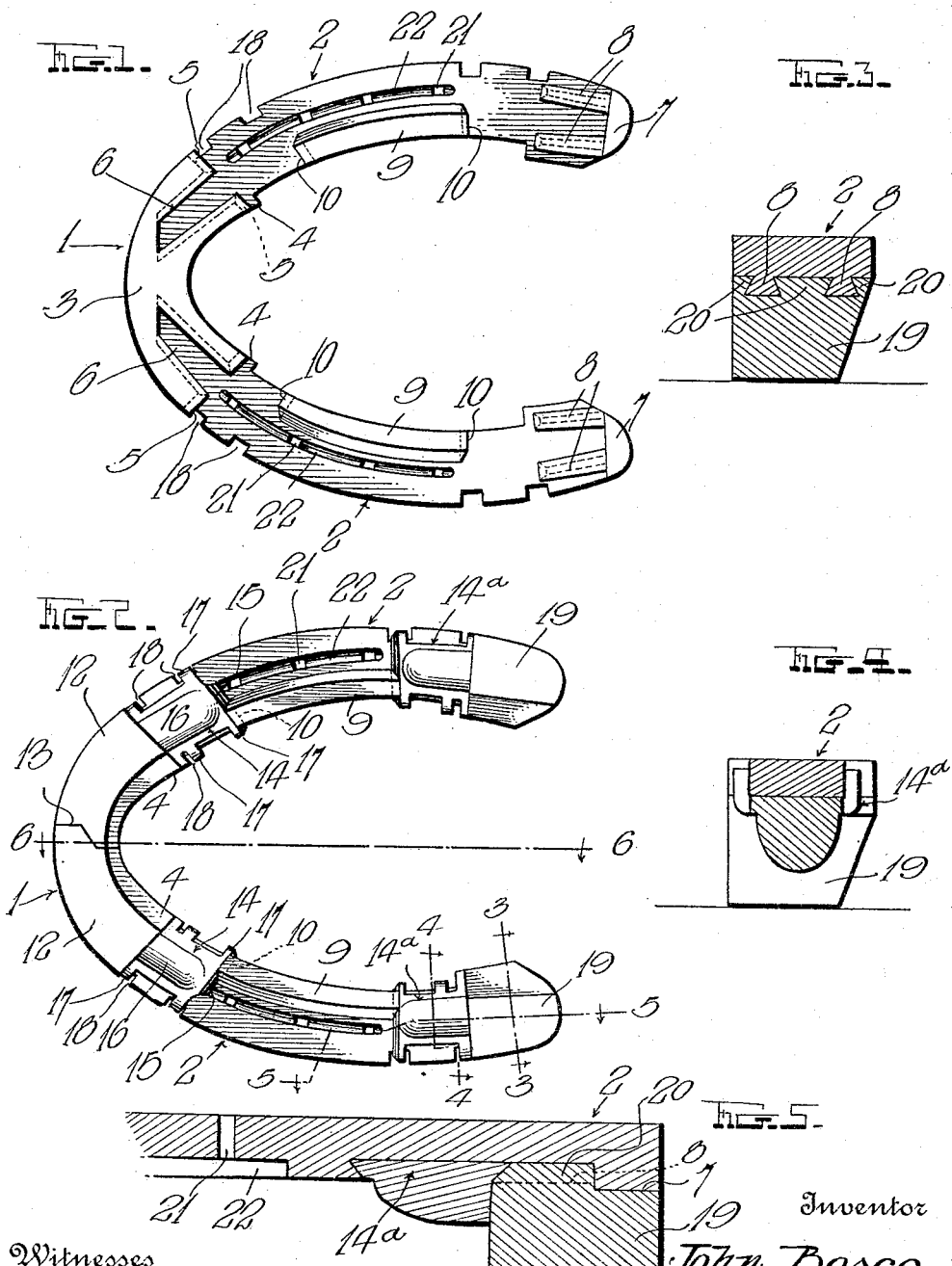

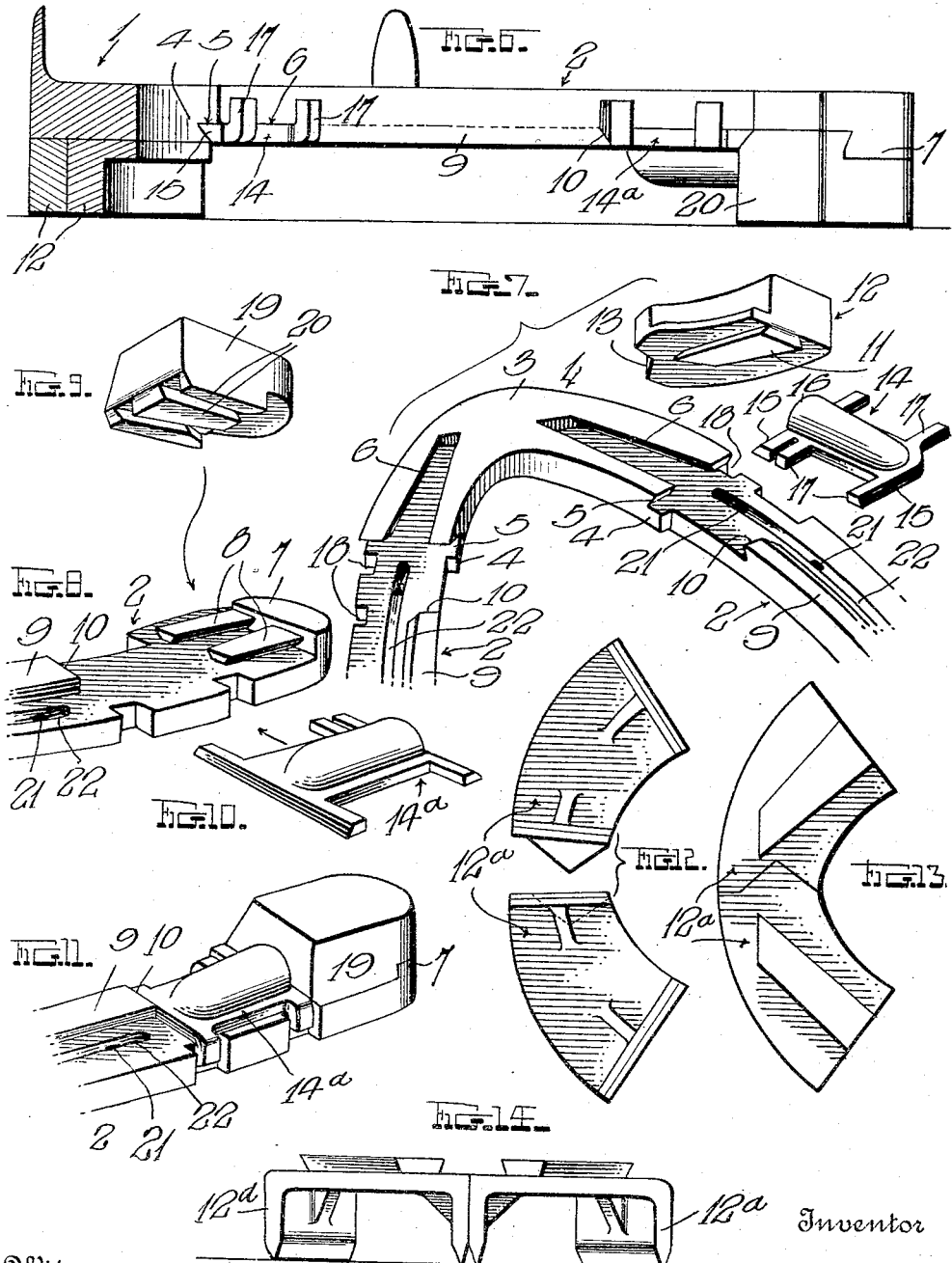

JOHN BOSCO, OF NEW YORK, N. Y.

HORSESHOE.

1,194,941.  Specification of Letters Patent.  Patented Aug. 15, 1916.

Application filed February 3, 1916. Serial No. 75,998.

*To all whom it may concern:*

Be it known that I, JOHN BOSCO, a citizen of the United States, residing at New York, in the county of New York and State of New York, have invented certain new and useful Improvements in Horseshoes; and I do declare the following to be a full, clear, and exact description of the invention, such as will enable others skilled in the art to which it appertains to make and use the same.

My invention which relates to improvements in horseshoes, has for its object to provide a device of this class having efficient means for detachably securing different styles of calks thereto.

With this general object in view, the invention resides in certain novel features of construction and in unique combinations of parts to be hereinafter fully described and claimed, the descriptive matter being supplemented by the accompanying drawings which constitute a part of this application and in which:—

Figure 1 is a bottom plan view of the shoe proper, the calks being removed; Fig. 2 is a similar view with the calks secured in place; Figs. 3 and 4 are detail vertical transverse sections taken on the planes indicated by the lines 3—3 and 4—4 of Fig. 2; Fig. 5 is a detail longitudinal section as viewed on the plane of the line 5—5 of Fig. 2; Fig. 6 is a central vertical longitudinal section taken on the plane designated by the line 6—6 of Fig. 2; Fig. 7 is a perspective view of the front end of the shoe, one of the calks at said front end, and the retaining plate for said calk; Fig. 8 is a perspective detail of the rear end of one arm of the shoe; Fig. 9 is a similar view of one of the rear calks; Fig. 10 is a perspective of one of the plates for retaining the rear calks in operative position; Fig. 11 is a perspective showing Figs. 8, 9 and 10 assembled; Fig. 12 is a bottom plan view showing a differently constructed pair of calks for use at the front end of the shoe; Fig. 13 is a top plan view of these calks; and Fig. 14 is a front elevation thereof.

In specifically describing the construction shown in the drawings above briefly described, similar characters will be placed on corresponding parts throughout the several views and reference will be herein made to the numerous elements by their respective indices. To this end, the numeral 1 designates broadly the improved shoe, while the numerals 2 indicate the arms thereof. The front end of the shoe is formed on its lower side with an integral enlargement 3 which extends horizontally onto the front ends of the arms 2, these front ends being preferably increased in width as disclosed at 4. The rear ends of the portions of the enlargement 3 which extend onto the arms 2 are positioned transversely of said arms and undercut as shown at 5. Said portions are also formed with forwardly converging channels 6 which open through the undercut ends 5 and through the bottom of the aforesaid enlargement 3. The channels 6 are preferably wedge-shaped, being decreased gradually in width from their rear to their front ends and being closed at the latter. Also, as clearly shown in the numerous figures of the drawings, the side walls of said channels are undercut.

The rear ends of the arms 2 are formed with depending enlargements 7 each so shaped as to form a pair of longitudinally disposed ribs 8 undercut on their inner and outer sides and on their front ends, said ribs preferably converging slightly toward their rear ends. Interposed between the front ends of the ribs 8 and the rear ends of the enlargement 3, and disposed adjacent the inner edges of the arms 2, is a pair of longitudinally extending ribs 9 having undercut ends 10 positioned transversely of the aforesaid arms. These undercut ends of the ribs constitute abutments coöperating with the undercut ends 5 and the front ends of the ribs 8, to retain calk anchoring devices yet to be described, in operative position.

Disposed at the front end of the shoe and having forwardly converging undercut ribs 11 received snugly in the channels 6, is a pair of forwardly converging calks 12 preferably having front ends 13 of zigzag formation disposed in contact with each other, the rear ends of the calks terminating flush with the ends 5 as shown.

Calk retaining plates 14 are driven between the ends 5 and the front ends 10 of the ribs 9, said plates having beveled edges 15 which engage the undercuts of the parts just mentioned. The plates 14 are preferably wedge-shaped and are provided with integral bracing ribs 16 on their lower sides, the front ends of said ribs abutting the rear ends of the calks 12. Accidental removal of the plates 14 is prevented by forming fingers 17 on their ends and by bending these fingers upwardly into engagement with the opposite edges of the arms 2, the outer edges of these arms being preferably formed with notches 18 for the reception of their respective fingers 17. When the calks 12 are to be removed, however, straightening of the fingers in question will readily allow this operation.

Disposed beneath the rear ends of the arms 2 are appropriately shaped rear calks 19 having undercut ribs 20 on their upper sides engaging the undercut ribs 8 and terminating flush with the front ends of the latter to hold these calks 19 in operative position. Retaining plates 14ª practically identical in construction with the plates 14 are employed, these plates being driven between the rear ends of the ribs 9 and the front ends of ribs 20 as shown.

For securing the improved shoes to the hoofs of draft animals, the arms 2 are formed with the usual nail receiving openings 21 and are grooved longitudinally at 22 to receive the heads of the nails.

The calks 12 and 19 above described are shown as provided with flat lower faces, these calks being adapted for ordinary use, but when slipping upon ice or the like is to be prevented, these calks may be removed and others of the type shown at 12ª in Figs. 12, 13 and 14 may be used. In these figures, the front calks only are illustrated since it will be readily understood that those used at the rear will resemble these calks in so far as the anti-slipping properties thereof are concerned. Regardless of the fact that but two types of calks are shown, I wish it understood that any desired style may be used within the scope of the invention.

From the foregoing, taken in connection with the accompanying drawings, the construction, manner of operation and numerous advantages of the improved shoe will be readily understood without requiring a more extended explanation. In conclusion, I will state that although certain specific details have been shown and described for obtaining probably the best results, numerous changes may be made within the scope of the invention as claimed without sacrificing any of the main advantages thereof.

I claim:—

1. A horseshoe having substantially parallel longitudinally disposed undercut ribs at the front and rear ends of its arms on the lower side thereof, front and rear calks having undercut ribs received snugly between the aforesaid ribs and removable by movement toward the inner ends thereof, abutments on the lower sides of said arms spaced from the aforesaid calks, and calk retaining members received snugly between said abutments and calks.

2. A horseshoe having substantially parallel longitudinally disposed ribs at the front and rear ends of its arms on the lower side thereof, said ribs being undercut on their inner sides and on their inner ends, front and rear calks having undercut ribs received snugly between the first named ribs, undercut abutments on the arms of the shoe spaced from the undercut ends of said first named ribs, and calk retaining members received snugly between the latter and the abutments and having beveled portions engaging the undercuts thereof.

3. A horseshoe having a horizontally extending enlargement depending from one of its ends and formed with an undercut end disposed transversely of the shoe, said enlargement having a channel formed therein opening only through said undercut end and through the lower side of said enlargement, said channel being formed with undercut side walls, a calk having an undercut rib received snugly in said channel and terminating flush with the undercut end of said enlargement, an undercut abutment spaced from said end of the enlargement, and a calk retaining plate received snugly between said end and said abutment and having beveled edges engaging the undercuts thereof, said plate having an end bent laterally into engagement with the edge of the shoe to prevent removal of said plate.

4. A horseshoe having a horizontally extending enlargement depending from one of its ends and formed with an undercut end disposed transversely of the shoe, said enlargement having a channel formed therein opening only through said undercut end and through the lower side of said enlargement, said channel being formed with undercut side walls, a calk having an undercut rib received snugly in said channel and terminating flush with the undercut end of said enlargement, an undercut abutment spaced from said end of the enlargement, and a calk retaining plate received snugly between said end and said abutment and having beveled edges engaging the undercuts thereof, said plate having fingers at its ends bent laterally into engagement with opposite edges of the shoe to prevent removal of said plate.

5. A horseshoe having a horizontally extending enlargement depending from one of its ends and formed with an undercut end disposed transversely of the shoe, said enlargement having a channel formed therein opening only through said undercut end and through the lower side of said enlargement, said channel being formed with undercut side walls, a calk having an undercut rib received snugly in said channel and terminating flush with the undercut end of said enlargement, an undercut abutment spaced from said end of the enlargement, a calk retaining plate received snugly between said end and said abutment and having beveled edges engaging the undercuts thereof, fingers on the ends of said plate bent laterally into engagement with the edges of the shoe to prevent removal of said plate, and a bracing rib formed integrally with the lower side of said plate and bearing against the calk.

6. A horseshoe having at its front end a depending enlargement extending horizontally onto the two arms of the shoe, said enlargement having formed therein two forwardly converging channels opening through its lower side and through its rear end, said channels having closed front ends and having undercut side walls, a pair of forwardly converging calks having undercut ribs received snugly in said channels, said calks being formed with zigzag front ends contacting with each other, and releasable means for normally preventing removal of the calks.

In testimony whereof I have hereunto set my hand in presence of two subscribing witnesses.

JOHN BOSCO.

Witnesses:
JAMES P. BLUE,
JAMES D. HINES.